(12) United States Patent
Raines et al.

(10) Patent No.: US 8,720,948 B2
(45) Date of Patent: May 13, 2014

(54) ACTIVE BOLSTER WITH PROTECTED WELD FOR BLADDER

(71) Applicant: Ford Global Technologies, LLC, Dearborn, MI (US)

(72) Inventors: Stacey H. Raines, Ypsilanti, MI (US); Nicholas A. Mazzocchi, Ann Arbor, MI (US); Latasha N. Smith, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/627,181

(22) Filed: Sep. 26, 2012

(65) Prior Publication Data

US 2014/0084572 A1    Mar. 27, 2014

(51) Int. Cl.
*B60R 21/05* (2006.01)
*B60R 21/205* (2011.01)

(52) U.S. Cl.
USPC .................. 280/752; 290/728.3; 290/732

(58) Field of Classification Search
CPC ........ B60R 21/02; B60R 21/04; B60R 21/16; B60R 21/045; B60R 21/20; B60R 21/205; B60R 2021/024; B60R 2021/0407
USPC ....................... 280/752, 728.3, 732
See application file for complete search history.

(56) References Cited

U.S. PATENT DOCUMENTS

| | | | |
|---|---|---|---|
| 5,613,706 A | | 3/1997 | Parker et al. |
| 5,932,832 A | | 8/1999 | Hansen et al. |
| 6,032,978 A | * | 3/2000 | Spencer et al. ............ 280/730.1 |
| 6,213,497 B1 | * | 4/2001 | Spencer et al. ............ 280/730.1 |
| 6,265,097 B1 | | 7/2001 | Konno et al. |
| 6,758,493 B2 | | 7/2004 | Conlee et al. |
| 6,935,655 B2 | | 8/2005 | Longhurst et al. |
| 8,448,985 B2 | * | 5/2013 | Kalisz ............................ 280/752 |
| 8,474,868 B2 | * | 7/2013 | Kalisz et al. .................. 280/753 |
| 8,544,876 B2 | * | 10/2013 | Best et al. .................. 280/730.1 |
| 8,579,325 B2 | * | 11/2013 | Roychoudhury ............. 280/752 |
| 2004/0155447 A1 | * | 8/2004 | Smith et al. ..................... 280/753 |
| 2004/0212182 A1 | * | 10/2004 | Canterberry .................. 280/737 |
| 2005/0127641 A1 | * | 6/2005 | Cowelchuk et al. ........ 280/728.3 |
| 2011/0316300 A1 | * | 12/2011 | Kalisz ........................ 296/37.12 |
| 2012/0068441 A1 | * | 3/2012 | Kalisz ........................ 280/728.3 |
| 2012/0080871 A1 | * | 4/2012 | Roychoudhury et al. .... 280/742 |
| 2012/0112439 A1 | * | 5/2012 | Roychoudhury .......... 280/728.3 |
| 2012/0248741 A1 | * | 10/2012 | Kalisz ........................ 280/728.2 |
| 2012/0267878 A1 | * | 10/2012 | Kalisz et al. ............... 280/728.2 |

OTHER PUBLICATIONS

Raj S. Roychoudjury, et al., Blow-Molded Plastic Active Knee Bolsters, SAE Technical Paper Series, 2004-01-0844, Mar. 8-11, 2004.
Bijoy K. Saraf, et al., Active Bolster for Side Impact Protection, SAE Technical Paper Series, 2008-01-0191, Apr. 14-17, 2008.

* cited by examiner

*Primary Examiner* — Karen Beck
(74) *Attorney, Agent, or Firm* — Vichit Chea; MacMillan, Sobanski & Todd, LLC

(57) ABSTRACT

An active bolster for mounting at an interior trim surface of an automotive vehicle has a plastic-molded, expandable inner wall having a welding flange disposed at an outer perimeter and a pleated region bending inward from the welding flange. A plastic-molded outer wall overlies the inner wall, wherein the welding flange is hot welded to the outer wall to form an inflatable bladder for receiving an inflation gas. The inner wall further includes a blocking rib extending from between the welding flange and the pleated region into abutment with the outer wall to restrict flow of the inflation gas against the welding flange.

13 Claims, 5 Drawing Sheets

ACTIVE BOLSTER WITH PROTECTED WELD FOR BLADDER

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to active bolsters for occupant crash protection in automotive vehicles, and, more specifically, to an active bolster with an inflatable bladder formed by a plastic panel with pleats that unfold during inflation so that the bolster moves evenly into position for cushioning an impacting body.

An active bolster is a vehicle occupant protection device with a gas-inflatable bladder to absorb impacts and reduce trauma to occupants during a crash. As opposed to deployable air bag cushions that emerge from behind various openings upon inflation, active bolsters use the interior trim surface itself to expand at the beginning of a crash event for absorbing the impact and dissipating energy through the action of an inflation gas. U.S. Pat. No. 8,205,909, issued Jun. 26, 2012, incorporated herein by reference, discloses an active knee bolster integrated into a glove box door that is light weight and visually attractive. Pending U.S. application Ser. No. 13/089,401, filed Apr. 19, 2011, also incorporated herein by reference, discloses a typical structure wherein an active bolster includes an outer wall or panel that faces a vehicle occupant attached to an inner wall or panel along a sealed periphery. One or both of the walls is deformable in order to provide an inflatable bladder. For example, the inner wall may have a pleated (i.e., accordion-like) region that straightens out during inflation. The walls are initially spaced apart by a small amount when in their pre-deployment, non-inflated condition. This allows ingress of the inflation gas in a manner that achieves even inflation across the panel.

The inner and outer walls of a typical active bolster are comprised of molded thermoplastics such as polyethylene, polyolefin, or PVC. They are typically injection molded but could also be blow molded. When formed separately, the walls must be hermetically joined around their periphery in order to form the inflatable bladder. The joint must be strong to resist separation as a result of the high pressures during inflation.

A known method of sealing the bladder walls is by hot welding, which involves heating of the matching surfaces and then compressing them together. Examples include hot plate welding, IR welding, and laser welding. A generally planar welding flange may be provided around the outer perimeter of the inner wall which is received by a generally planar surface of the outer wall. The outer wall surface may also include upstanding sealing ribs that increase the weld strength by penetrating the welding flange during the hot welding process in which the welding flange and sealing ribs are heated and then compressed. Despite the penetration of the sealing ribs, weld strength has continued to present a potential failure mode for active bolsters.

SUMMARY OF THE INVENTION

The present invention eliminates a potential channeling of inflation gas into the hermetic seal to thereby improve the integrity of the weld.

In one aspect of the invention, an active bolster for mounting at an interior trim surface of an automotive vehicle is comprised of a plastic-molded, expandable inner wall having a welding flange disposed at an outer perimeter and a pleated region bending inward from the welding flange. A plastic-molded outer wall overlies the inner wall, wherein the welding flange is hot welded to the outer wall to form an inflatable bladder for receiving an inflation gas. The inner wall further includes a blocking rib extending from between the welding flange and the pleated region into abutment with the outer wall to restrict flow of the inflation gas against the welding flange.

DETAILED DESCRIPTION OF PREFERRED EMBODIMENTS

Figure 1:
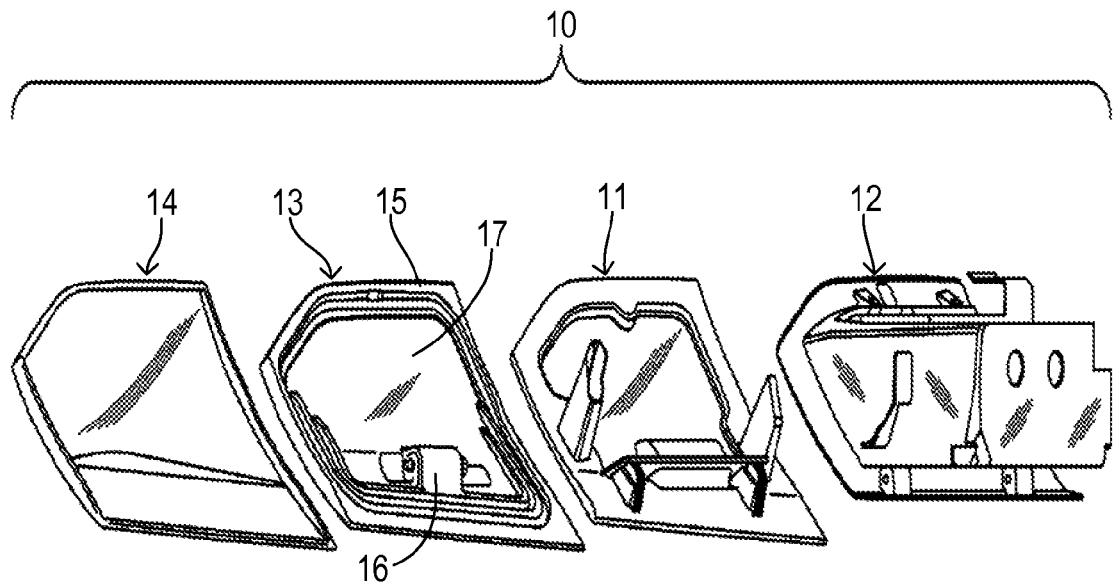
FIG. 1 is an outward-looking, exploded perspective view of an active knee bolster glove box door system of a type to which the present invention can be applied.

Referring now to FIG. 1, a prior art active knee bolster system 10 has a base panel component 11 which forms the foundation for the bolster. Base 11 may be either attached to the vehicle by hinging from a storage cavity or glove box 12 as shown in FIG. 1, or mounted to another structure such as an instrument panel support below a steering column, for example. Such locations are accessible to the knees of an individual riding in a corresponding seating position within a vehicle.

Base 11 acts as a reaction surface for supporting an inflatable bladder formed by an inner wall 13 and an outer wall 14 that are joined around their periphery 15. Walls 13 and 14 are preferably comprised of molded plastics (such as thermoplastic polyolefin (TPO)) and are joined by plastic welding, such as hot plate welding, to form a peripheral seal around a central region 17 for forming a bladder. An inflation gas source (i.e., inflator) 16 is electronically controlled for activating during a crash to release gas to inflate the bolster. Outer wall 14 may comprise the Class A interior trim surface such as the outside of the glove box door, or an additional skin or cover (not shown) can be applied to its outer surface.

Figure 2:
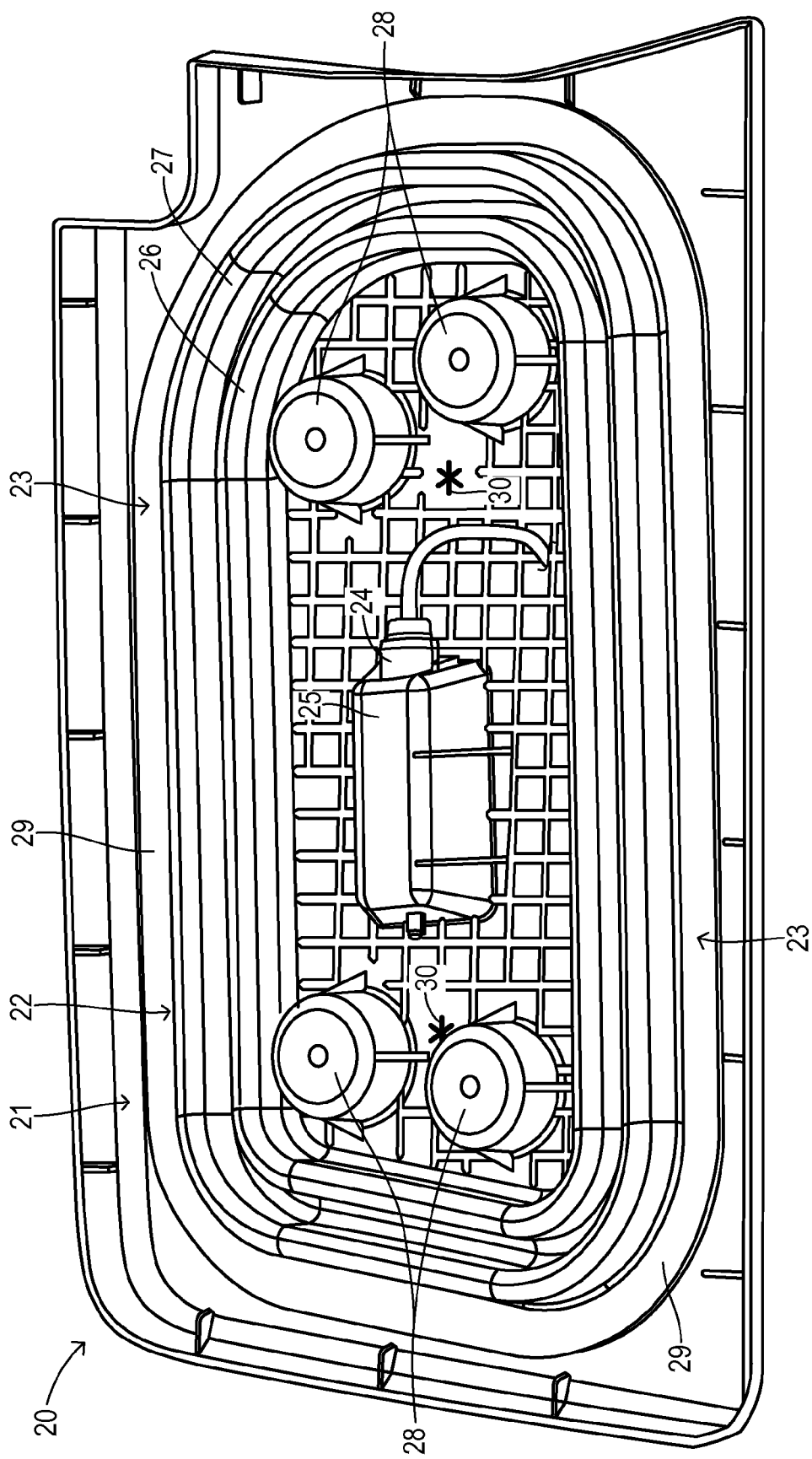
FIG. 2 is a plan view of an inner and outer wall assembly of an active bolster.

FIG. 2 is a rear view of an inflatable bladder 20 in one preferred embodiment of the invention. A plastic-molded outer wall 21 overlies a plastic-molded, expandable inner wall 22. Walls 21 and 22 are joined around a closed perimeter region 23 to form an inflatable bladder having an open central volume between walls 21 and 22 to receive an inflation gas from an inflator 24 mounted in a recess 25 of inner wall 22 during a crash event. Inner wall 22 includes a plurality of pleats, such as 26 and 27, to accommodate the expansion of inner wall 22 during inflation. A plurality of bosses 28 are used to mount inner wall 22 to a reaction surface. A welding flange 29 extends circumferentially from inner wall 22. Vent holes 30 comprised of an asterisk-shaped pattern cut through inner wall 22 may be included for venting the central volume prior to and during inflation.

Figure 3:
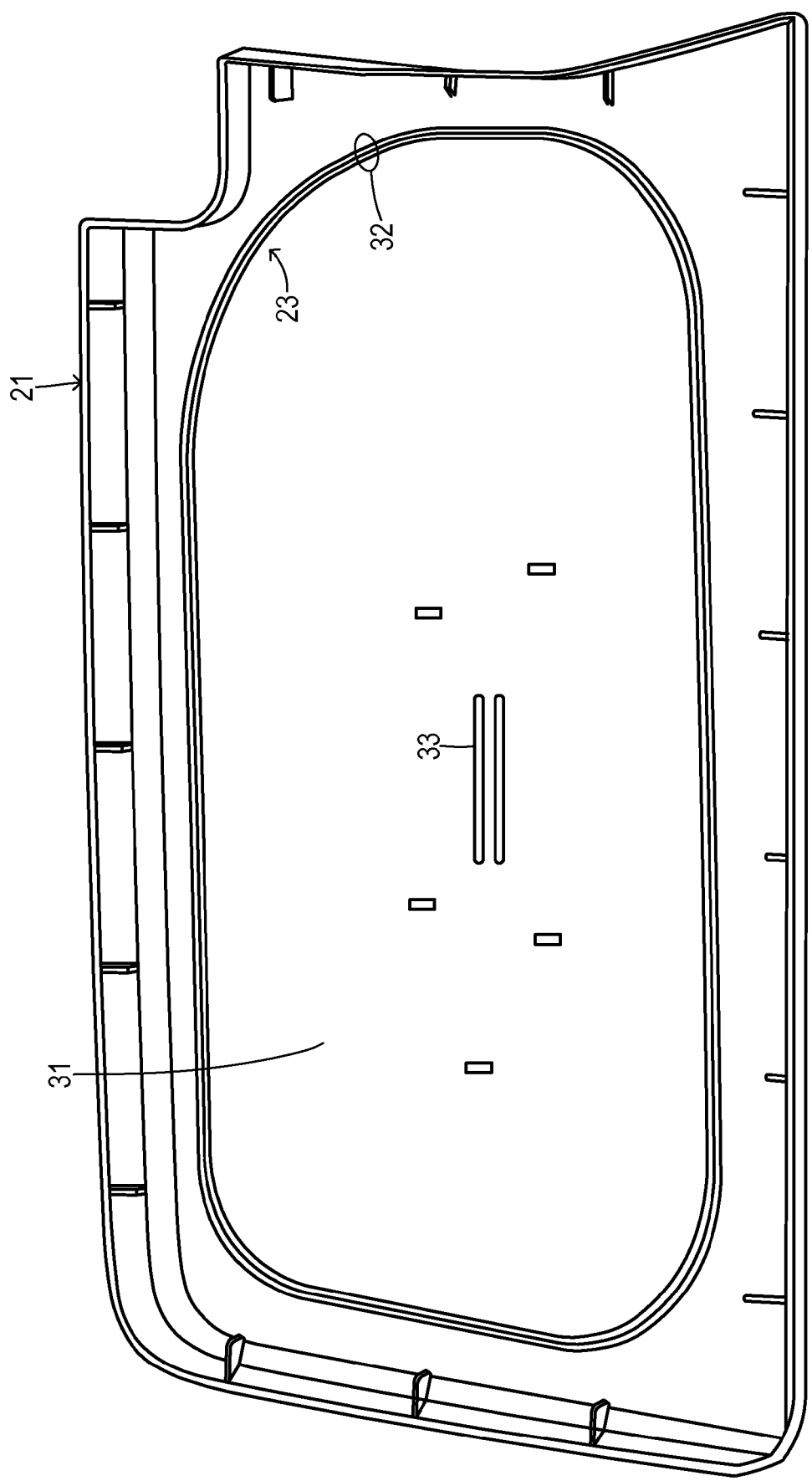
FIG. 3 is a perspective view of the outer wall of FIG. 2 with the inner wall removed.

FIG. 3 shows outer wall 21 with the inner wall removed revealing a bladder surface 31 that faces the inner wall when assembled. A plurality of upstanding ribs 32 follow closed perimeter region 23 and are joined with flange 29 of inner wall 22 (FIG. 2) by hot welding to create a hermetic seal for the inflatable bladder. Ribs 33 are provided for supporting the inflator.

Figure 4:
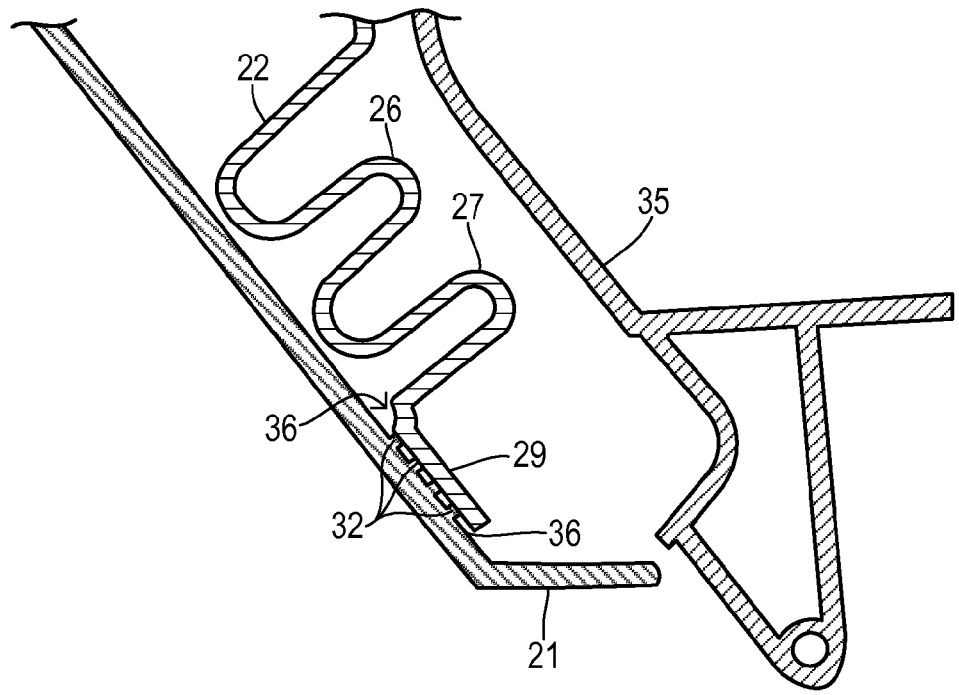
FIG. 4 is a cross-sectional view of an active bolster showing a weld wherein inflation gas becomes channeled into the weld.

FIG. 4 illustrates a potential failure point for a conventional weld structure of a type in which sealing ribs 32 penetrate into welding flange 29. A backing wall 35 provides a reaction surface to which inner wall 22 is mounted. Due to an incomplete penetration of ribs 32 into flange 29, a gap 36 normally exists between flange 29 and the inner surface of outer wall 21. The inner bladder surface of inner wall 22 is exposed to the inflation gas during expansion, including the interior of pleat 27 and a portion of gap 36 (bounded by the first sealing rib 32). The channeling of inflation gas into the weld via gap 36 can create a separation force that tends to push the welded components apart. Moreover, the force may have a significant component oriented parallel to ribs 32 which corresponds to the weakest direction of the weld. Thus, any particular inflation pressure might more easily peel apart the welded components from within gap 36.

Figure 5:
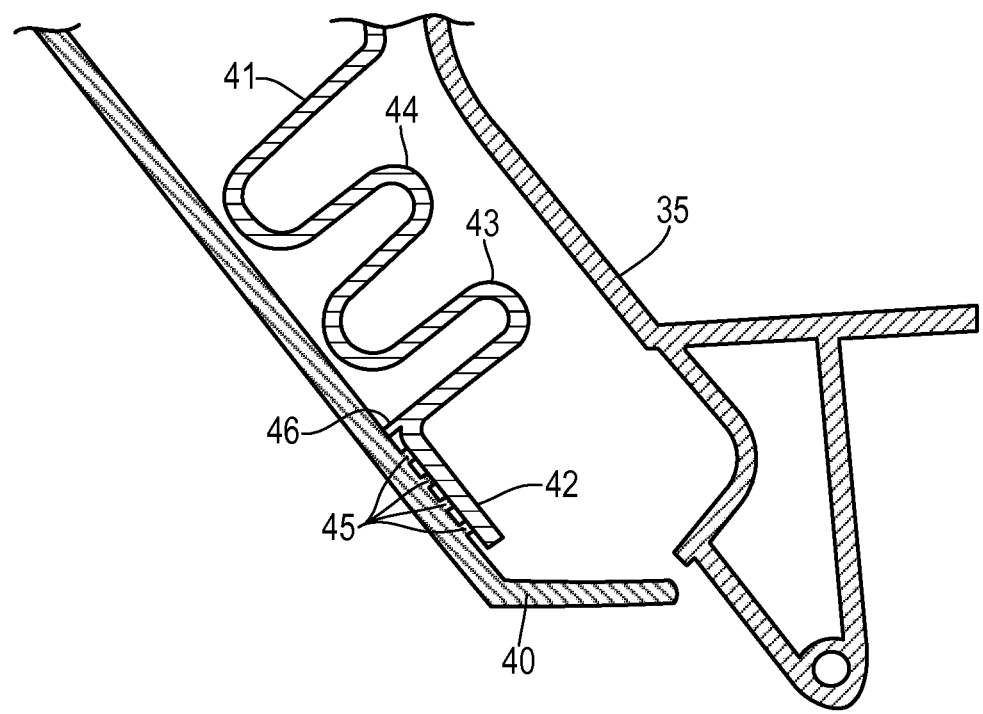
FIG. 5 is a cross-sectional view of an active bolster of the present invention wherein the inner wall includes a blocking rib that restricts inflation gas from being channeled into the weld.

FIG. 5 shows a first embodiment of the invention wherein a plastic-molded outer wall 40 overlies an expandable inner wall 41 with a welding flange 42 disposed at its outer perimeter and a pleated region with pleats 43 and 44 bending inward from flange 42. Outer wall 40 has sealing ribs 45 that have been joined to welding flange 42 by hot welding. Inner wall 41 further includes a blocking rib 46 that extends from wall 41 between flange 42 and pleat 43 into abutment with outer wall 40. Blocking rib 46 preferably extends for a full circumference around inner wall 41 at an inside edge of welding flange 42. Due to its abutment with outer wall 40, blocking rib 46 restricts the flow of inflation gas against welding flange 42 that could otherwise cause the weld to separate and fail. Blocking rib 46 may extend substantially transversely with respect to flange 42 in order to contact outer wall 40 in order to make a good sealing contact to prevent inflation gas from entering the weld. As shown in FIG. 5, blocking rib 46 may preferably be substantially co-planar with a side of outermost pleat 43. Even more preferably, blocking rib 46 may be compressed against outer wall 40 so that substantially no inflation gas flows past blocking rib 46. Consequently, the inflation gas pushes against the weld in a direction transverse to sealing ribs 45, which may correspond to the direction of greatest strength of the weld.

Figure 6:
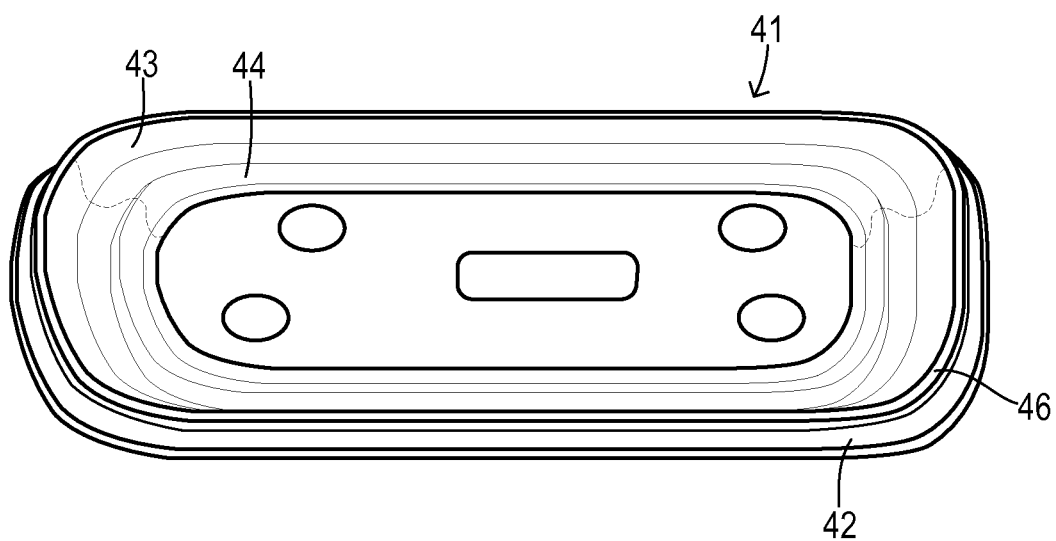
FIG. 6 is a perspective view of a side of the inner wall that faces the outer wall.

FIG. 6 is a perspective view of inner wall 41 showing that blocking rib 46 extends for the full circumference of the inner wall adjacent flange 42.

Figure 7:
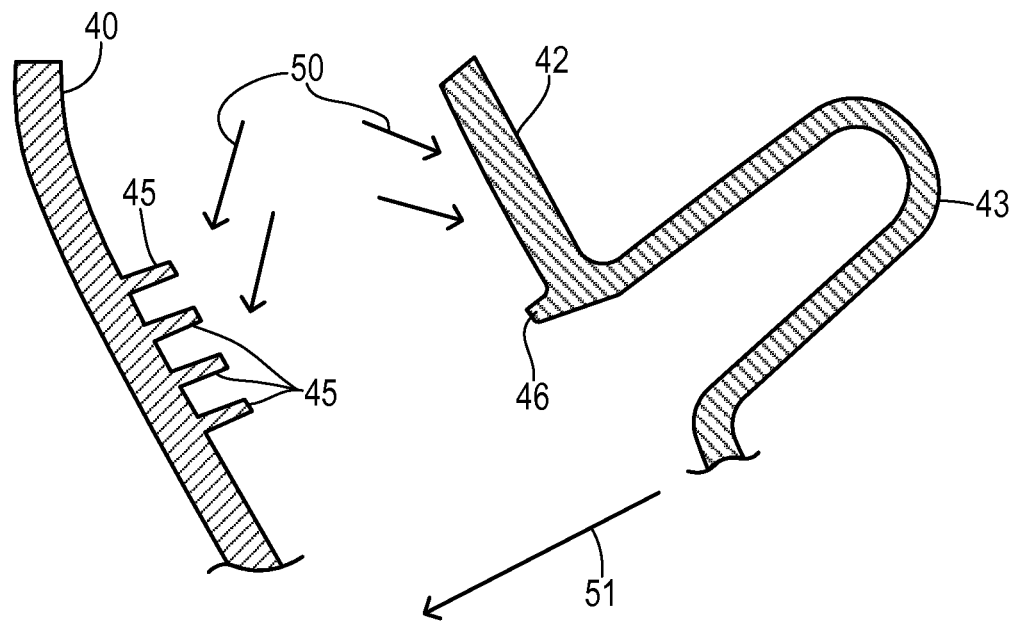
FIG. 7 shows a cross section of an inner wall and an outer wall during a hot welding process.
Figure 8:
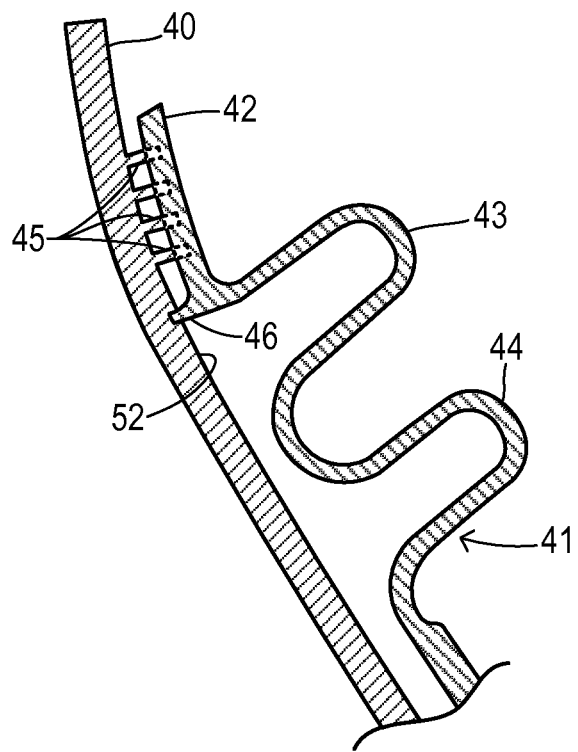
FIG. 8 is a cross-sectional view of a weld formed as a result of the present invention.

FIG. 7 illustrates a hot welding operation wherein juxtaposed surfaces of flange 42 and sealing ribs 45 are heated by a heat source 50 which may be comprised of thermal radiation (e.g., infrared or laser) or conductive heating by a hot plate, for example. The heated walls are placed in a fixture and brought together in the direction shown by arrow 51 so that flange 42 is compressed against sealing ribs 45. Due to the compression, ribs 45 penetrate flange 42 as shown in FIG. 8. Compression of the fixture also compresses blocking rib 46 against an inside surface 52 of outer wall 40. The amount of compression by the fixture may correspond to a displacement of blocking rib 46 by an amount that would otherwise penetrate outer wall 40 by an amount shown. However, since neither blocking rib 46 nor the corresponding portion of surface 52 are heated, no penetration of rib 46 actually occurs. Instead, a spring-like compression results that improves the sealing characteristics of blocking rib 46. Thus, by restricting flow of any inflation gas present within the bladder against flowing to the area of the weld or the welding flange, the integrity of the weld is protected.

What is claimed is:

1. An active bolster for mounting at an interior trim surface of an automotive vehicle, comprising:
    a plastic-molded, expandable inner wall having a welding flange disposed at an outer perimeter and a pleated region bending inward from the welding flange; and
    a plastic-molded outer wall overlying the inner wall, wherein the welding flange is hot welded to the outer wall to form an inflatable bladder for receiving an inflation gas;
    wherein the inner wall further includes a blocking rib extending from between the welding flange and the pleated region into abutment with the outer wall to restrict flow of the inflation gas against the welding flange.

2. The active bolster of claim 1 wherein the blocking rib extends substantially transversely with respect to the welding flange.

3. The active bolster of claim 1 wherein the blocking rib is substantially coplanar with a side of an outermost pleat of the pleated region.

4. The active bolster of claim 1 wherein the blocking rib is not welded to the outer wall, and wherein the blocking rib is compressed against the outer wall.

5. The active bolster of claim 1 wherein the blocking rib extends for a full circumference around the inner wall and the welding flange.

6. The active bolster of claim 1 wherein the outer wall comprises a plurality of sealing ribs juxtaposed with the welding flange, and wherein the sealing ribs penetrate the welding flange as a result of the hot welding.

7. An active bolster for mounting at an interior trim surface of an automotive vehicle, comprising:
    a plastic-molded, expandable inner wall having a welding flange disposed at an outer perimeter and a pleated region bending inward from the welding flange;
    a plastic-molded outer wall overlying the inner wall, wherein the welding flange is hot welded to the outer wall to form an inflatable bladder, and wherein the outer wall provides a portion of interior trim surface for cushioning an impact of an occupant of the vehicle; and
    an inflator for coupling an inflation gas into the inflatable bladder in response to a crash event of the vehicle;
    wherein the inner wall further includes a blocking rib extending from between the welding flange and the pleated region into abutment with the outer wall to restrict flow of the inflation gas against the welding flange.

8. The active bolster of claim 7 wherein the blocking rib extends substantially transversely with respect to the welding flange.

9. The active bolster of claim 7 wherein the blocking rib is substantially coplanar with a side of an outermost pleat of the pleated region.

10. The active bolster of claim 7 wherein the blocking rib is not welded to the outer wall, and wherein the blocking rib is compressed against the outer wall.

11. The active bolster of claim 7 wherein the blocking rib extends for a full circumference around the inner wall and the welding flange.

12. The active bolster of claim 7 wherein the outer wall comprises a plurality of sealing ribs juxtaposed with the welding flange, and wherein the sealing ribs penetrate the welding flange as a result of the hot welding.

13. An inflatable bladder for an active bolster, comprising:
a substantially-planar outer wall; and
an inner wall with a plurality of pleats and a perimeter welding flange welded to the outer wall;
wherein the inner wall further includes a blocking rib extending from between the welding flange and the pleats into abutment with the outer wall to restrict flow of inflation gas into a gap between the outer wall and the welding flange.

\* \* \* \* \*